United States Patent [19]

Hauser et al.

[11] 3,800,864
[45] Apr. 2, 1974

[54] PIN-FIN COOLING SYSTEM

[75] Inventors: Ambrose A. Hauser; Thomas A. Zuxier, both of Cincinnati, Ohio

[73] Assignee: General Electric Company, Cincinnati, Ohio

[22] Filed: Sept. 5, 1972

[21] Appl. No.: 286,047

[52] U.S. Cl.................... 165/47, 165/186, 415/115
[51] Int. Cl............................................. F24h 3/00
[58] Field of Search ........... 60/39.66; 415/115, 116, 415/117, 175

[56] References Cited
UNITED STATES PATENTS

| | | | |
|---|---|---|---|
| 3,583,824 | 6/1971 | Smuland | 60/39.66 |
| 2,648,519 | 8/1953 | Cambini | 415/115 |
| 2,685,429 | 8/1954 | Auyer | 415/116 |

*Primary Examiner*—Charles J. Myhre
*Assistant Examiner*—Theophil W. Streule, Jr.
*Attorney, Agent, or Firm*—James M. Kipling; Derek P. Lawrence

[57] ABSTRACT

A fluid cooled element for partially defining a hot gas flow path within a gas turbine engine is provided with a cooling system incorporating a plurality of pin-fins or similar protuberances disposed upon a face of the wall bounding the hot gas passage. The face and an associated liner combine to define a cooling fluid plenum adjacent the wall, with the protuberances extending into the plenum. The liner bounds a cooling fluid passage, and an aperture is provided for introducing cooling fluid from the passage into the plenum. Another aperture is provided for exhausting cooling fluid from the plenum - into the hot gas passage, for example. The plenum can be divided into a plurality of independently cooled compartments by means of ribs extending substantially between the aforementioned cooled face of the wall and the liner. The protuberances can be arranged in greater densities per unit area in areas where heat concentrations exist in order to reduce temperature gradients. Furthermore, the apertures for introducing and exhausting cooling fluid to and from the plenum may be sized and positioned to concentrate greater quantities of fluid upon areas of heat concentrations.

10 Claims, 8 Drawing Figures

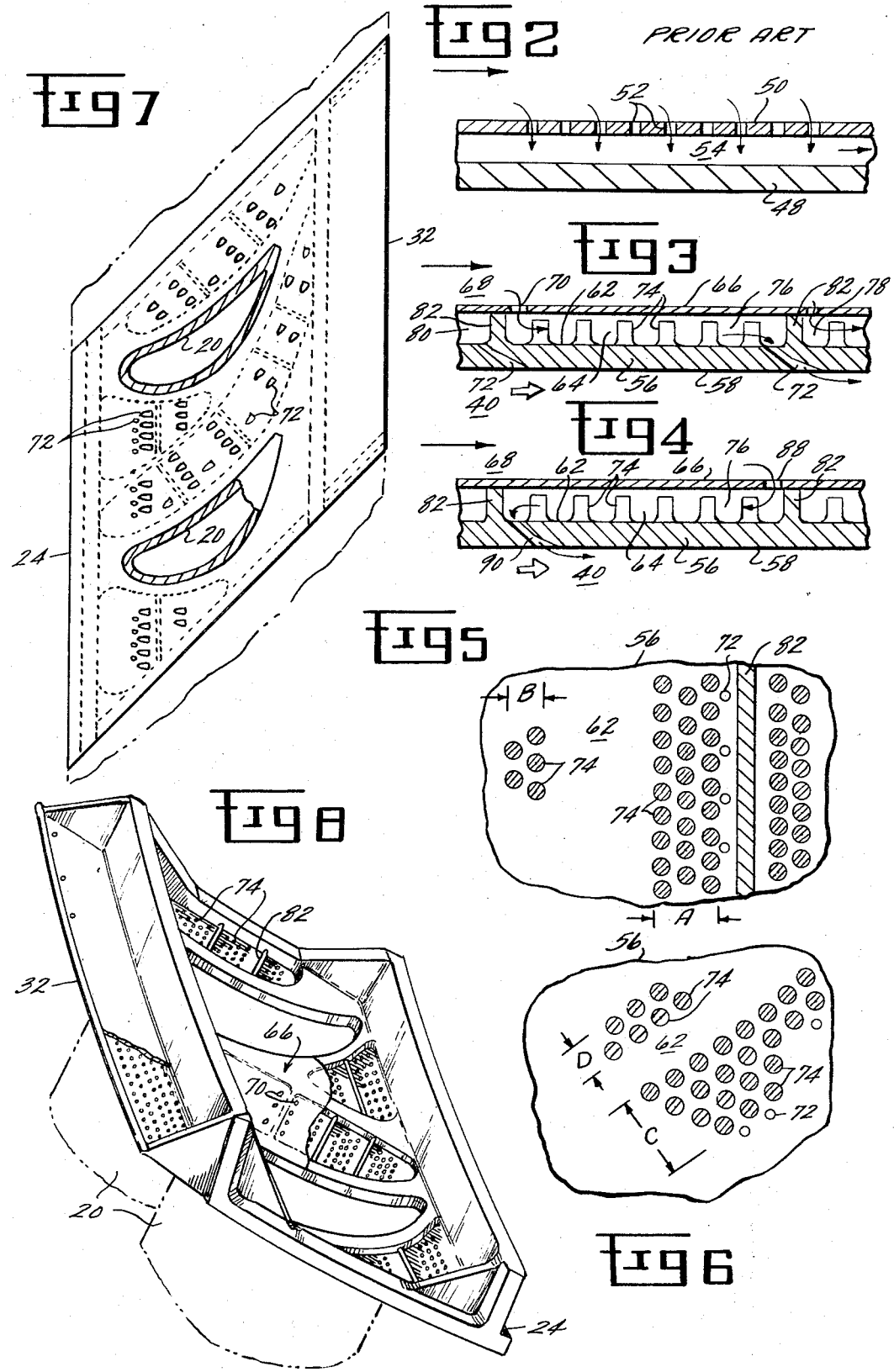

PIN-FIN COOLING SYSTEM

BACKGROUND OF THE INVENTION

The present invention relates to cooling systems and more particularly for cooling systems for use in gas turbine engines. The invention herein described was made in the course of or under a contract, or a subcontract thereunder, with the United States Department of the Air Force.

Of the many problems associated with the design of gas turbine engines, few are more significant than the dissipation of heat. Modern gas turbine engines operate at temperatures in excess of 2,000°F. Hence, the nondestructive distribution and dissipation of heat generated thereby is essential.

Of particular pertinence with respect to this problem are elements of the gas turbine engine which serve to define a hot gas flow path therein such as combustor liners, bands, shrouds, rings, etc. Members such as these are subjected to the direct impact of the heated products of combustion. The development of high temperature materials for use in these members have served to partially improve the situation. Furthermore, a variety of means for directing a flow of cooling fluid into contact with heated members have been provided.

One widely used prior art cooling configuration operative to transmit a cooling fluid, commonly air, into contact with hot members is the so-called impingement cooling system. This system conventionally utilizes a perforated liner disposed in proximity with a heated member, for example a shroud, for the purpose of directing cooling air substantially normally to the surface of the shroud in order to enhance turbulence and improve convective heat transfer. In order to effectively limit the amount of cooling air impinged onto the shroud (for the purpose of maintaining engine efficiency) the perforations in the liner are required to be small in size. A disadvantage of this characteristic is that particulate material ingested by a gas turbine engine equipped with this type cooling system may become lodged within the liner perforations and substantially reduce the cooling of the associated shroud. Over an extended period, this reduction may result in starving cooling air from the shroud, and lead to possible damage to the engine.

Another unsatisfactory characteristic of this type of prior art cooling system is that the shroud and perforated liner combine to form a single, undivided plenum for cooling air. Since the shroud may be subjected to localized heat concentrations such as hot streaks, sufficient air must be supplied to the entire plenum to cool in the area of these hot streaks. Thus the quantity of air required to be supplied to an individual plenum is determined by the portion of the associated member subjected to the highest temperature. This results in waste of an amount of cooling air, since cooler parts of the same shroud could be effectively cooled by a lesser quantity of cooling air.

The present invention overcomes possible clogging of the perforated liner as well as improving cooling efficiency by providing larger cooling fluid apertures and by allowing quantities of cooling fluid supplied to portions of heated elements to be locally determinable.

BRIEF SUMMARY OF THE INVENTION

It is therefore a primary object of the present invention to provide an improved cooling system for heated elements partially defining a hot gas flow path within a gas turbine engine.

It is another object of the present invention to provide such a cooling system having improved resistance to contamination by ingested particulate material.

It is a further object of the present invention to provide such a cooling system having the capability of providing locally determinable cooling within individual cooled elements.

The foregoing objects, as well as others which will become apparent from the description which follows, are accomplished by the present invention. In one form thereof, this invention provides an air-cooled nozzle ring or other walltype structure partially defining a hot gas flow path with its first face bounding the hot gas passage and its second face partially defining a plenum for cooling fluid (air, in this case, but other fluids are equally useable). A plurality of protuberances or pinfins are associated with the second face and extend into the plenum which is further defined by a liner spaced from the second face. A plurality of relatively large apertures in the liner provide means for introducing cooling air from an adjacent cooling air passage into the plenum, while apertures in the wall provide means for exhausting the cooling air from the plenum into the hot gas stream. The plurality of protuberances serve the dual purpose of enhancing turbulence and increasing the convective heat flow area of the second face of the wall. The plenum can be compartmentalized by the provision of a plurality of spaced ribs extending between the liner and the second face. The quantity of cooling air fed to the individual compartments may be determined according to localized heat concentrations in the wall by means of varying the size and/or number of introducing and exhausting apertures in the liner and wall respectively. Additional flexibility can be achieved by varying the density of protuberances per unit area of cooled surface.

DESCRIPTION OF THE DRAWING

For the purpose of facilitating the description of this invention, the appended drawings are incorporated, wherein:

FIG. 2 is a section view of a wall cooling system of the prior art;

FIG. 3 is a section view of a wall cooling system according to the present invention in one form thereof;

FIG. 4 is a section view of a cooling system of the present invention in an alternative form thereof;

FIG. 5 is a plan view of a portion of a cooling system of the present invention;

FIG. 6 is a plan view of another portion of a cooling system according to the present invention;

FIG. 7 is a plan view of a nozzle ring segment incorporating elements of the present invention; and FIG. 8 is an inverted, perspective view of the nozzle ring segment of FIG. 7.

DESCRIPTION OF A PREFERRED EMBODIMENT

Figure 1:
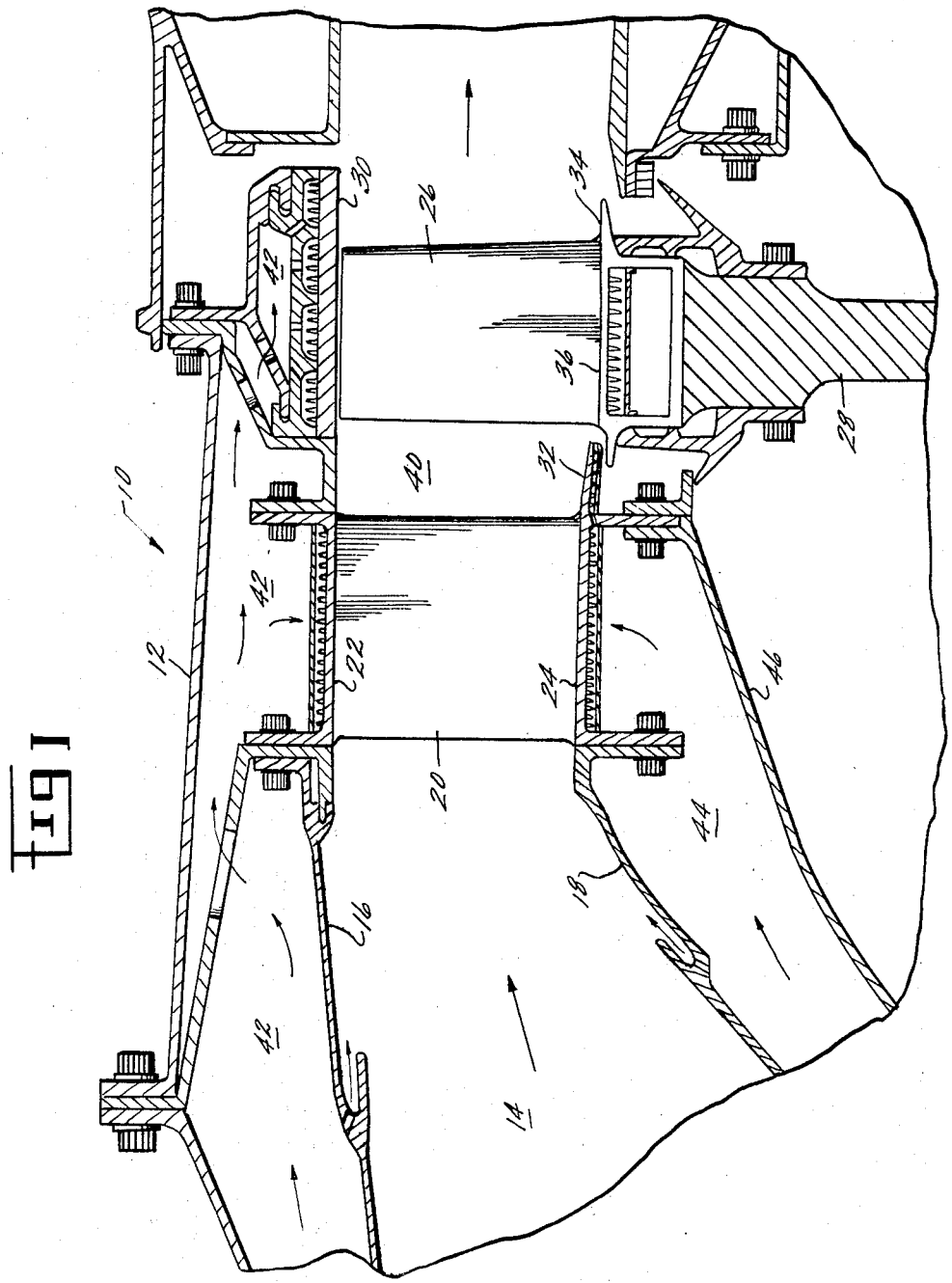
FIG. 1 is a partial section view of a portion of a gas turbine engine incorporating the present invention.

FIG. 1 discloses a partial section view of a gas turbine engine, generally designated 10, and including a structural frame 12. The engine includes a combustion chamber 14 defined between an outer liner 16 and inner liner 18. Immediately downstream of the combustion chamber is a row of turbine inlet nozzles 20 carried by segmented nozzle rings 22 (at its radially outward side) and 24 (at its radially inward side). Downstream of nozzles 20 are disposed a first row of turbine buckets 26 carried by a rotatable turbine wheel 28. Encircling the buckets 26 is a shroud 30. An axial extension 32 of nozzle ring 24 extends into proximity with buckets 26. An axial extension 34 of bucket platform 36 projects downstream of the buckets.

A hot gas passage 40 is thus defined between the inner and outer nozzle rings 24 and 22 respectively, and between the axial projection 32 of the inner ring, the turbine bucket platform 36 and its extension 34 and the encircling shroud 30. It may be appreciated that each of these members bounding and partially defining hot gas passage 40 is subjected to the intense heat associated with the products of combustion exiting combustor 14. It is toward the effective and efficient cooling of such members that the present invention is particularly directed.

Toward this end, and in a conventional manner, cooling air passages 42 and 44 are defined respectively toward the radially outward and inward sides of hot gas passage 40. Passage 42 is defined between combustor liner 16 and frame 12, while passage 44 is defined between combustor liner 18 and an inward structural member 46. As is well known in the art, cooling fluid here is fed to the two passages 42 and 44 from an upstream compressor (not shown) to provide a supply of cooling air for various air cooled elements of the engine.

The gas turbine engine depicted in FIG. 1 operates in the conventional manner, to wit: a flow of pressurized air is directed into combustion chamber 14 wherein is burned an appropriate fuel, the products of combustion of which issue downstream of the chamber 14 through hot gas passage 40 and into engagement with nozzles 20 and buckets 26. The flow transmits energy to buckets 26 for the purpose of rotating turbine wheel 28 which serves to drive associated engine elements. The hot gas stream exits to the right in FIG. 1 to provide a substantial thrust toward the left in the same Figure.

The cooling system of the present invention will now be particularly described with respect to the radially inward nozzle ring 24; however, it may be seen and appreciated that this invention is readily adaptable to use with any similar member defining the hot gas passage. For the purpose of example, the cooling system of the present invention has been depicted in FIG. 1 as cooperating not only with inner ring 24, but also with the outer ring 22, the axial extension 32 of ring 24, and with shroud 30.

FIG. 2 depicts a prior art cooling device as described hereinabove wherein a wall 48 to be cooled is associated with a liner 50 having a plurality of small perforations 52 disposed therein. Cooling air passing through perforations 52 enters a plenum 54 defined between the liner and wall 48 and then impinges upon wall 48 substantially normally to said wall. Turbulent flow occurs as a result of this impingement, and heat is transferred by convection to the air which is exhausted downstream as illustrated. As has been discussed previously, this configuration has notable objectionable characteristics owing to possible clogging of the perforations 52 by ingested particulate debris, as well as inherent inefficiency owing to the inability of this type of cooling system to efficiently limit the quantity of cooling air required for effective cooling on a localized basis.

These problems are effectively remedied by the present invention. FIGS. 3 and 4 illustrate several concepts of the present invention in alternative embodiments. FIG. 3 depicts a cross-sectional view of an air-cooled element for partially defining a hot gas passage within a gas turbine engine, similar to the situation presented in FIG. 2 with respect to the prior art. A wall 56 has a first face 58 bounding hot gas passage 40 and a second face 62 partially defining a cooling air plenum 64. A cover plate or liner 66 is disposed adjacent and spaced from the second face 62 and further defines plenum 64. A cooling air passage 68 is bounded by liner 66 and an aperture 70 through the liner provides means for introducing cooling air into the plenum 64. An aperture 72 through wall 56 spaced laterally (substantially axially of the hot gas passage 40) and radially from aperture 70 communicates the plenum 64 with the hot gas passage 60. The latter apertures provide means for exhausting cooling air from the plenum in a film over the first face 58 after the same air has cooled the second face in accordance with the present invention.

According to a major object of the present invention, the second face 62 cooperates with and carries a plurality of protuberances or pin-fins 74 which extend from the second face into the plenum 64. These protuberances serve the function of increasing the effective convective heat flow area of the second face 62. The protuberances also perform the function presently performed in the prior art by the plurality of apertures 52 in liner 50 of FIG. 2 in that turbulent air flow is promoted. This is accomplished without the possibility of using substantially larger apertures 70 in liner 66 to provide entry to the cooling air. These larger apertures are substantially less likely to become clogged by debris ingested by the engine, while maintaining effective heat transfer.

According to another major object of the present invention, plenum 64 can be divided into separate and independently cooled compartments 76 and 78 and 80 by means of a plurality of upstanding ribs 82 extending from the first face 62 of wall 56 to the liner 66. The compartments are substantially isolated from one another, each of the compartments having means for introducing and means for exhausting the cooling air so that the quantity of cooling air supplied to each of the compartments can be determined independently of the others by increasing or decreasing the relative size or number of inlet and outlet apertures.

It is thus possible by making use of the present invention to divide a single air cooled wall into a plurality of independently cooled compartments with cooling air metered to each compartment according to the required cooling in that localized portion of the structure. This is a substantial improvement over the prior art configuration disclosed in FIG. 2 wherein the quantity of air used is determined by the condition of wall 48 at its hottest point, the excess air over that required to cool other portions being wasted.

It is another characteristic of the present invention that the arrangement of protuberances 74 may be varied as to quantity per unit area. This allows a more dense disposition in areas of hot spots or streaks associated with wall 56 and a less dense disposition in areas remote from such heat concentrations. FIGS. 5 and 6 illustrate such variations in the disposition of protuberances according to localized temperature differences within wall 56. In FIG. 5, face 62 of wall 56 is illustrated in a portion thereof including a compartment defining rib 82. It may be assumed that the heat transferred through wall 56 is greater near rib 82 and, as a result, that a large cooling capability is required at that point. For this reason a first group of protuberances 74, the group labeled A, is disposed near rib 86. The density of the protuberances 74 within group A is high and the number utilized is large. In contrast, a second group B of protuberances 74 is disposed in an area which may be assumed to be of relatively low temperature, thus requiring less cooling. The density of protuberances in area B is less than that in group A, and the number of protuberances required is also less.

This characteristic is further illustrated in FIG. 6 wherein a group of protuberances C is disposed in an area of high temperature while a second group D is disposed in an area of lower temperature.

It may be appreciated that the unique flexibility of the cooling system of the present invention resulting from the possibility of varying the quantity of cooling air directed into a given plenum compartment, as well as the possibility of varying the disposition of protuberances according to localized heat concentrations is extremely valuable in the art of gas turbine engine design wherein optimized utilization of cooling air is a large factor of overall engine efficiency.

Another variation made permissible by the present invention is illustrated by a comparison of FIGS. 3 and 4 depicting different portions of wall 56. In FIG. 3, the direction of flow within the hot gas passage 40 is illustrated by the large arrow and the direction of flow of cooling air through plenum 64 is illustrated by the small arrows therein. This is likewise true with respect to FIG. 4. In FIG. 3, the disposition of inlet apertures 70 and exhaust aperture 72 results in a flow of cooling air within plenum 64 in the same direction as the direction of the flow of hot gas within the passage 60. This is known as parallel heat transfer, and is suitable to certain heat transfer situations. On the other hand, the disposition of an inlet aperture 88 and an exhaust aperture 90 in FIG. 4 is such that cooling air within the plenum flows in the opposite direction to that in the hot gas passage. This is known as counterflow heat transfer and is preferable to parallel flow heat transfer in certain situations. It is thus made possible by the present invention to incorporate parallel flow and counterflow heat transfer in different portions of the same cooled elements.

Returning now to the context of the gas turbine engine of FIG. 1, a portion of a segmented nozzle ring 24 is depicted in FIGS. 7 and 8. In those Figures, the nozzle ring segment is depicted from the top in FIG. 7 and from the bottom in FIG. 8. Nozzles 20 are shown spaced apart by a predetermined distance upon the ring. Cooling is required of the area between nozzles since this area partially defines hot gas passage 40 of FIG. 1. FIG. 7 illustrates the possible variation of number and size of cooling air exit apertures 72 according to the quantity of cooling air required within given compartments of the plenum. FIG. 8 illustrates a portion of liner 66 as well as several compartment defining ribs 82. Within the individual compartments, a plurality of the protuberances 74 of the present invention are disposed. Also depicted are a plurality of cooling air entrance apertures 70 relating to a second compartment. These respective apertures serve to illustrate the variable nature of the size and number of such apertures disposable with respect to the various compartments.

In the environment of the nozzle ring illustrated, the concepts of the present invention are readily adaptable. Hence the disposition of protuberances 74 can be in the varying densities described above, the size and number of entrance and exit apertures 70 and 72 may be varied to adjust quantities of cooling air to the individual compartments, and the disposition of entrance and exhaust apertures 70 and 72 with respect to an individual compartment may be such as to create a parallel flow or counterflow heat exchange situation. As stated above, these concepts can also be used to cool other heated elements of the engine.

While the present invention has been disclosed with particular reference to a preferred embodiment therof, the concepts of this invention are readily adaptable to other embodiments, and those skilled in the art may vary the structure thereof without departing from the essential spirit of the present invention. For example, the plurality of protuberances have been disclosed herein to be attached directly to the face of the wall to be cooled. It is apparent that a substantially similar situation can be achieved by the disposition of an independent protuberance carrying element in a plenum for performing a similar function. Other variations will also occur to those skilled in the art. It is contemplated that such variations be within the scope of the appended claims.

What is claimed as new and desired to be secured by Letters Patent of the United States is:

1. A fluid-cooled element for partially defining a hot gas passage within a gas turbine engine, said element comprising:
   a wall having first and second faces, the first face bounding the hot gas passage and the second face partially defining a cooling fluid plenum;
   means for introducing cooling fluid into the plenum; and
   a plurality of pin-fins cooperating with the second face for promoting turbulence within the cooling fluid in the plenum for increasing heat transfer from the wall to the cooling fluid, the pin-fins comprising discrete, generally cylindrical protuberances extending a predetermined distance into the plenum.

2. The element of claim 1 wherein said wall is subjected to localized heat concentrations; and
   said pin-fins are arranged in a predetermined array corresponding to said heat concentrations, a greater number of pin-fins per unit area in the vicinity of said heat concentrations than in areas remote from said heat concentrations whereby heat transfer between said wall and said cooling fluid is locally adjustable to reduce temperature gradients within said wall.

3. The element of claim 1 further including means for exhausting cooling fluid from said plenum and directing said fluid over said first face.

4. The element of claim 3 wherein said means for introducing and said means for exhausting are laterally and radially spaced from one another.

5. The element of claim 4 wherein said lateral spacing is substantially axial of said hot gas passage.

6. The element of claim 5 wherein said means for introducing is axially upstream of said means for exhausting, whereby parallel flow heat exchange is achieved.

7. The element of claim 5 wherein said means for introducing is axially downstream of said means for exhausting, whereby counterflow heat exchange is achieved.

8. The element of claim 3 wherein said plenum is divided into a plurality of compartments substantially isolated from one another, each of said compartments having means for introducing and means for exhausting said cooling fluid, whereby the quantity of cooling fluid supplied to each of said compartments may be determined independently of the others.

9. The element of claim 8 further including: a liner spaced from said second face and partially defining the plenum;

a plurality of ribs extending substantially between said wall and said liner defining said compartments; and a cooling fluid passage bounded by said liner; and wherein said means for introducing comprises a first aperture communicating said plenum with said cooling fluid passage and said means for exhausting comprises a second aperture communicating said plenum with said hot gas passage.

10. The element of claim 9 wherein said first apertures are non-uniform in size and said second apertures are non-uniform in size, whereby different quantities of cooling fluid may be supplied to individuals of said compartments.

* * * * *